United States Patent [19]

Gantz et al.

[11] Patent Number: 4,960,105

[45] Date of Patent: Oct. 2, 1990

[54] SUN OPERATED BOILER FOR HEATING LIQUIDS

[76] Inventors: Josef Gantz, No. 11 Sokolov Street; Menahem Tenenboim, 14 Chatam Sofer Street, both of Beney Braq, Israel

[21] Appl. No.: 355,279

[22] Filed: May 22, 1989

[51] Int. Cl.$^5$ ................................. F24J 2/04
[52] U.S. Cl. .................... 126/437; 126/362; 126/434
[58] Field of Search ............... 126/435, 437, 433, 434, 126/442, 419, 361, 362; 165/104.19 A; 137/590, 592

[56] References Cited

U.S. PATENT DOCUMENTS

| | | | |
|---|---|---|---|
| 1,425,427 | 8/1922 | Watson | 126/362 |
| 1,577,863 | 3/1926 | Kercher | 126/362 |
| 1,873,854 | 8/1932 | Wheeler | 126/434 |
| 2,076,087 | 4/1937 | Long | 126/362 |

FOREIGN PATENT DOCUMENTS

| | | | |
|---|---|---|---|
| 907387 | 4/1944 | France | 126/362 |
| 33562 | 3/1980 | Japan | 126/434 |
| 148354 | 9/1983 | Japan | 126/437 |
| 22570 | 10/1911 | United Kingdom | 126/362 |

Primary Examiner—James C. Yeung
Attorney, Agent, or Firm—Edwin D. Schindler

[57] ABSTRACT

A sun operated installation for heating liquids generally comprises a collector of insolation and a storage tank. The collector and the tank are interconnected by a circulation pipe. In that pipe are provided two inlet openings, one in the upper and one in the lower part of the storage tank. The upper opening is larger than the lower one. In consequence the liquid in the upper part of the tank is heated earlier than that in the lower part. Installations of that type are destined primarily, but not exclusively to heating water for use in domestic establishments.

2 Claims, 1 Drawing Sheet

SUN OPERATED BOILER FOR HEATING LIQUIDS

FIELD OF THE INVENTION

The present invention relates to the installations of solar liquid heating arrangements comprising a storage tank and a circulation pipe system between the said storage tank and a solar collector.

BACKGROUND OF THE INVENTION

A solar liquid heating installation is usually comprised of a storage tank and a solar collector. The system is generally filled with a liquid and a conduit leading liquid from the solar collector to the upper portion of the storage tank, as well as a conduit returning liquid from the storage tank to the solar collector. With the absorption of sun rays by the solar collector, a natural or motoric circulation is created between the storage tank and the solar collector.

In the prevalent type of such installations, the larger the internal volume of the storage tank, the more time it takes to heat the liquid in the storage tank. The solar collectors, which provide heat to the storage tank, are subject to the heating of all the liquid in the storage tank. That means that a hot liquid of desired temperature from the storage tank is not obtainable until all the liquid in the storage tank has reached that temperature. This disadvantage is especially present with relatively large storage tanks, since one must wait a long time, in order to utilize the respective liquid—mostly hot water.

OBJECT OF THE INVENTION

Since the generally employed solar collectors will provide heat during the first stage of operation in the upper portion of the storage tank, the above operation would permit the achievement of higher temperatures in the upper portion of the storage tank by more rapid heating or on days when the weather would not facilitate the heating of the entire liquid contents of the storage tank, but would facilitate the heating of a smaller quantity of liquid in the upper portion of the storage tank. It should be noted that the liquid is always removed for use, from the upper portion of the storage tank. Hence there would be great advantage of concentrating a hot liquid in the upper portion of the storage tank.

BRIEF DESCRIPTION OF THE DRAWINGS

In the drawings, FIG. 3 illustrates the invention when applied to a conduit already in use in an existing storage tank.

DETAILED DESCRIPTION OF PREFERRED EMBODIMENT

Figure 1:
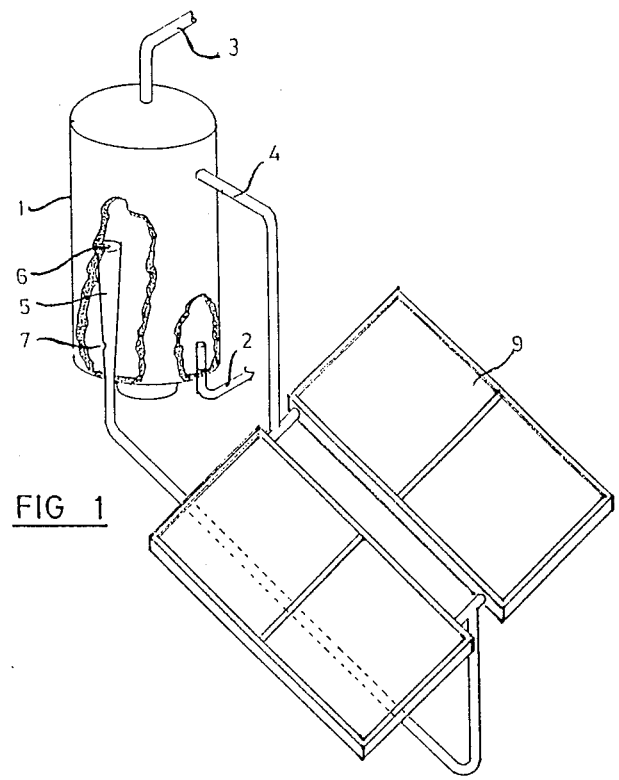
FIGS. 1, 2 and 3, show in merely schematical form, in FIGS. 1 and 2, two embodiments of the storage tank, and in FIG. 3, an embodiment applied to conventional storage tanks by way of adaptation.
Figure 2:
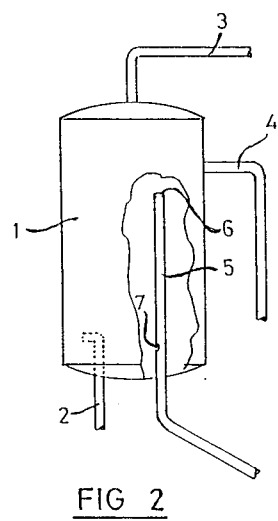

In the drawings, FIGS. 1 and 2, the storage tank as a whole is indicated by numeral 1. Water (or whatever other liquid) enters the tank 1 by way of conduit 2. A conduit 5 returns liquid from the storage tank to the solar collector 9. It starts being hot in the upper portion of the storage tank and port 6 in the upper portion of conduit 5, directs the liquid to return from the upper portion of the storage tank to the solar collector, thus giving preference to circulation between the storage tank and the solar collector from a small area in the upper portion of the liquid in the storage tank. As a result a heated liquid will be available for use, within a short time.

In the lower portion of conduit 5 which returns from the storage tank to the solar collector 9, port 7 will remain in the same location as heretofore, as indicated in drawings 1 and 2. Through this port, the liquid will be returned from the lower portion of the storage tank to the solar collector, so that the liquid in the lower portion of the storage tank would also be heated.

In order to give preference to the heating of the liquid in the upper portion of the storage tank, it is recommended that port 6 in drawing 1 should be wider than port 7 in the lower portion of the storage tank in drawing 1. The purpose is that the return of the liquid from the upper portion of the storage tank should be given priority over same return through port 7. However, the arrangement of FIG. 2, where port 6 and port 7 are of the same and sectional area would also be effective, though to a lesser extent.

Figure 3:
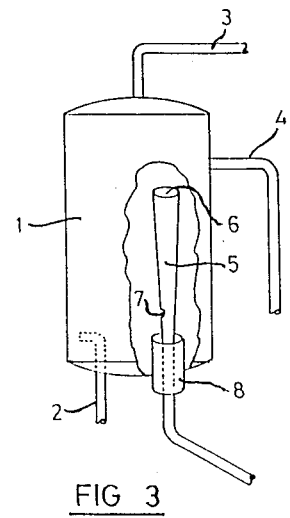

The invention could also be applied to existing storage tanks, as indicated in FIG. 3. This may be done by inserting a tube 5 into the duct 8 returning from the storage tank to the solar collector 9. The inserted tube should reach near the upper portion of the storage tank, and the upper port in conduit 5 would absorb the liquid returning from the upper portion of the storage tank to the solar collector, while in the lower portion of conduit 5, port 7 will remain, in order to absorb the liquid in the lower portion of the storage tank returning to the solar collector 9. This port is intended for heating the contents of the lower portion in the storage tank as well. The primary aim is to give preference to the heating of the upper portion of the storage tank.

In drawings FIGS. 1, 2, 3, conduit 5 is in no way limited to the number of holes or ports, height and location of conduit, neither is it limited with regard to the relation between the diameter of port 6 and that of port 7. Conduit 5 may be either insulated or not.

It will be seen that the present invention permits the construction of a solar system of simple structure. This construction results in great energy savings. The solar collector provides energy to the upper portion of the storage tank—giving it priority over the lower portion. Therefore within a short time part of the liquid in the storage tank is heated and may be utilized.

We claim:

1. Apparatus for heating a liquid by insolation, comprising:
    a storage tank;
    a circulation pipe having an upper top inlet port in an upper portion of said storage tank and a lower side inlet port in a lower portion of said storage tank;
    a solar collector, said solar collector and said storage tank being interconnected by said circulation pipe which extends upwardly through a substantial portion of said storage tank from below; and,
    means for transferring the liquid from said solar collector to said storage tank after the liquid has been heated.

2. Apparatus for heating a liquid by insolation, comprising:
    a storage tank;
    a circulation pipe having an upper top inlet port in an upper portion of said storage tank and a lower side inlet port in a lower portion of said storage tank, wherein the upper top inlet port has a larger cross-sectional area than the cross-sectional area of the lower side inlet port;

a solar collector, said solar collector and said storage tank being interconnected by said circulation pipe which extends upwardly through a substantial portion of said storage tank from below; and means for transferring the liquid from said solar collector to said storage tank after the liquid has been heated.

* * * * *